United States Patent
Bjørshol

[11] Patent Number: 5,862,620
[45] Date of Patent: Jan. 26, 1999

[54] APPARATUS FOR CONVEYING FISH HOOKS, ESPECIALLY LOOSE FISH HOOKS, TO A BAITING MACHINE

[76] Inventor: Kolbjørn Bjørshol, N-6560 Langoynesen, Norway

[21] Appl. No.: 704,506
[22] PCT Filed: Mar. 10, 1994
[86] PCT No.: PCT/NO94/00055
  § 371 Date: Oct. 23, 1996
  § 102(e) Date: Oct. 23, 1996
[87] PCT Pub. No.: WO95/24122
  PCT Pub. Date: Sep. 14, 1995
[51] Int. Cl.⁶ ............................ A01K 79/00; A01K 97/00
[52] U.S. Cl. .................................................................. 43/4
[58] Field of Search .................................. 43/4, 4.5, 27.4

[56] References Cited

U.S. PATENT DOCUMENTS

| | | | |
|---|---|---|---|
| 3,997,996 | 12/1976 | Nygaard | 43/4 |
| 4,354,323 | 10/1982 | Huff | 43/4 |
| 4,437,254 | 3/1984 | Facey et al. | 43/27.4 |
| 4,461,112 | 7/1984 | Jacobsen | 43/4 |
| 4,477,992 | 10/1984 | Lang et al. | 43/27.4 |
| 4,631,850 | 12/1986 | Chureau | 43/27.4 |
| 4,638,583 | 1/1987 | Bjorshol | 43/4 |
| 4,641,452 | 2/1987 | Bjorshol | 43/27.4 |
| 4,648,193 | 3/1987 | Alex et al. | 43/4 |
| 4,751,787 | 6/1988 | Jonsson | 43/4 |
| 4,896,449 | 1/1990 | Hopper | 43/4 |
| 5,257,473 | 11/1993 | Reynolds et al. | 43/27.4 |

FOREIGN PATENT DOCUMENTS 923668  3/1994  Norway .

*Primary Examiner*—Michael J. Carone
*Assistant Examiner*—Darren Ark
*Attorney, Agent, or Firm*—McAulay Nissen Goldberg Kiel & Hand, LLP

[57] ABSTRACT

An apparatus (10) feeds loose fish hooks singly to a baiting machine and comprises a rail (14) which receives fish hooks (19) in a hanging condition on the top of the rail (14). A feeding arrangement (11) conveys the fish hooks (19) along the rail (14) towards a slide member (26) which delivers the fish hooks singly to the baiting machine. The slide member (26) is provided with a cavity (27) having an associated opening (27b) for the reception of a portion (19a) of the hook. Opening (27d) of the cavity (27) is bounded endwise towards the rail (14) during movement of the slide member (26) between its catch position and its delivery position.

7 Claims, 2 Drawing Sheets

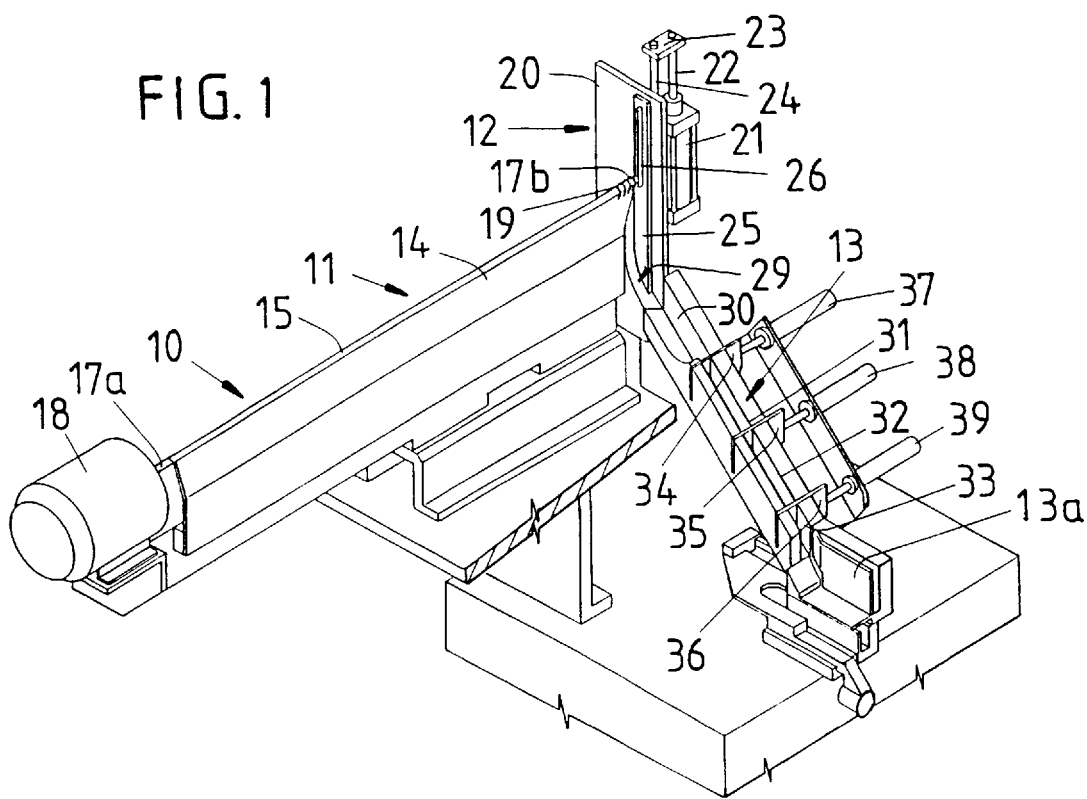
FIG. 1
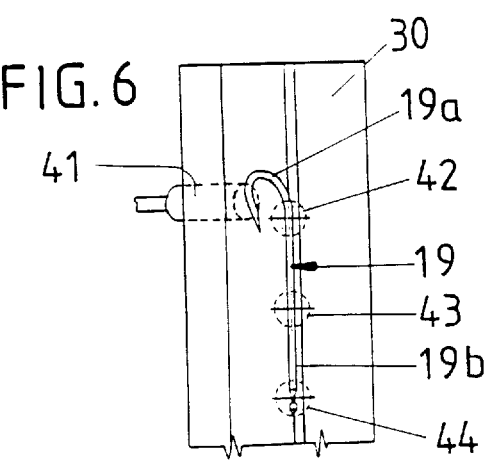
FIG. 6
FIG. 7

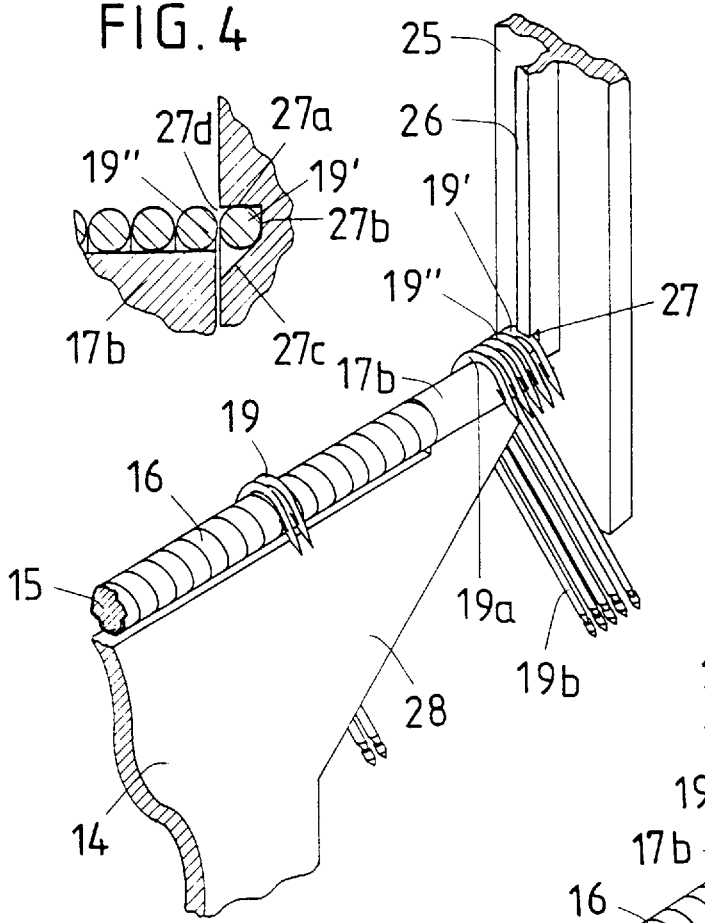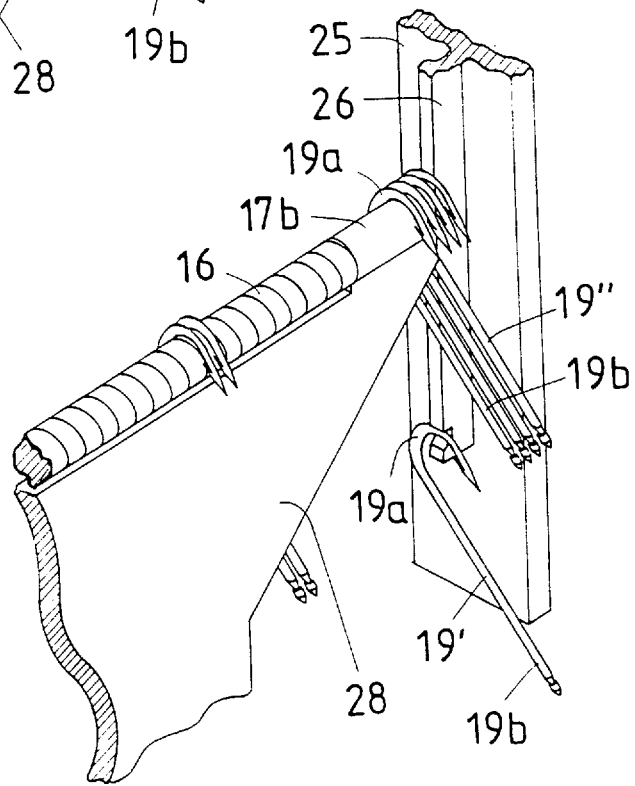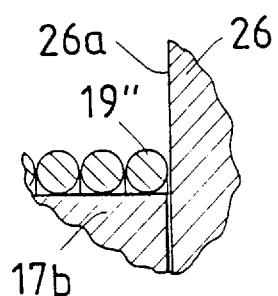

APPARATUS FOR CONVEYING FISH HOOKS, ESPECIALLY LOOSE FISH HOOKS, TO A BAITING MACHINE

The present invention relates to an apparatus for conveying fish hooks, especially separate fish hooks, one by one to a baiting machine. The apparatus includes a rail, for the reception of fish hooks in a hanging condition on the top of the rail, an associated feeding arrangement, for conveying the fish hooks in series along the rail towards one end, a hook-handling arrangement, for handling the fish hooks one after the other relative to the rail, and a chute, for delivering fish hooks to the baiting machine.

The apparatus according to the invention is more especially designed for use in connection with the baiting of fish hooks for fishing lines, where the fish hooks are introduced one by one into a baiting machine in connection with a baiting operation. The apparatus is particularly, but not exclusively, intended for use in connection with the handling of separate, that is to say loose fish hooks, the fish hooks in connection with a baiting operation or immediately after a baiting operation, being connected individually to an associated supply on a fishing line by means of connecting means known per se.

The apparatus shall thus be able to handle separate, that is to say loose fish hooks, which at the starting point are not connected with the supply. The movement of the fish hooks can thereby not be controlled by the movement of an associated supply, as previously conventional in connection with the baiting operation, for example as is shown in U.S. Pat. No. 4,631,850, but must be controlled mainly by the apparatus itself. By this it is important that each single fish hook assumes precisely the position intended.

It is an object of the invention to produce a relatively simple apparatus, which can convey fish hooks individually by way of simple means to a baiting machine, so that the fish hooks can be delivered directly to the baiting machine in an accurate manner in a specific position.

The apparatus according to the invention is characterised in that the hook-handling arrangement comprises a slide member, which is displaceable between a nook catching position and a hook delivery position in a path across the end of the rail, and in that the slide member in a front side thereof is provided with a cavity facing towards the end of the rail and adapted for reception of a portion or a fish hook therein. The cavity in the hook catching position of the slide member extends flush with an adjacent fish hook on the rail for automatic reception of the adjacent fish hook by means of a pushing force exerted by the feeding arrangement. The front side of the slide member beyond the cavity is adapted to bar a succeeding fish hook in a subsequent row of fish hooks on the feeding arrangement in side positions outside the hook catching position. The cavity in the hook delivery position of the slide member is uncovered outside the rail for automatic release of the fish hook for delivery into the chute to the baiting machine.

In connection with the baiting in a baiting machine there can also be effected an associated quality sorting. In this connection, the apparatus as indicated above is well-suited and the quality sorting can be effected without appreciable complications in a controlled manner with the single fish hook in an accurately established position. The quality sorting can be effected immediately in front of the baiting machine.

According to the invention, a positively controlled handling of the fish hooks is ensured by means of the slide member having an associated cavity which receives fish hooks one by one. The feeding arrangement is constantly feeding forwardly a series of fish hooks to the hook handling arrangement. The transfer of the fish hooks from the feeding arrangement to the delivery location can thus occur in a simple, accurately controlled manner, so that the fish hooks in the delivery position can assume an accurate position in connection with the subsequent baiting operation.

In the concept suggested above, the slide member is allowed to be deplaced in a plane crossing the longitudinal axis of the hook supporting rail, i.e. in any suitable directions, i.e. in horizontal, vertical or any other direction crossing the longitudinal axis of the hook supporting rail.

In a further aspect of the present invention, the apparatus is characterised in that the slide member consists of a bar-shaped member, which is reciprocatable in vertical directions relative to the rail, between an upper hook catching position and a lower hook delivery position, and that the cavity at its lower end is provided with a guide surface extending obliquely downwards and outwards for easy discharge of the fish hook from the slide member to the chute.

It is especially advantageous to move the slide member in a reciprocating movement in relation to the hook supporting rail.

By deplacing the slide member in vertical directions, additional advantages are achieved as to structural simplicity of the apparatus and easy, controlled handling of the fish hooks from the slide member to the associated chute. It is thus evident that by moving the slide member and the fish hook contained in the cavity of the slide member vertically downwards, the fish hook tends to continue its vertically downwards movement. This will ensure movement of the fish hook away from the cavity and safely into the following chute.

Further features of the invention will be evident from the following description having regard to the accompanying drawings, in which:

FIG. 1 shows in perspective the apparatus according to the invention, including a sorting apparatus for fish hooks combined with a subsequent baiting apparatus.

FIG. 2 shows a section of the apparatus of FIG. 1, including a part of a feed rail with the associated feeding arrangement plus a hook-catching arrangement which is illustrated in a hook catching position.

FIG. 3 shows the same as in FIG. 2 with the hook-catching arrangement illustrated in a hook delivery position.

FIG. 4 illustrates a partial sectional view of the feed rail and associated hooking catching arrangement with a hook in place;

FIG. 5 illustrates a sectional view similar to FIG. 4 with the hook catching arrangement in the hook delivery position;

FIG. 6 shows a detail in the sorting apparatus according to FIG. 1, seen from above.

FIG. 7 shows a cross-section of the detail illustrated in FIG. 6.

The apparatus 10, as shown in FIG. 1, comprises a feeding arrangement 11, a hook-catching arrangement 12, and a guide chute 13 with an associated intake 13a to a baiting machine.

The feeding arrangement 11 comprises an elongate, horizontally extending rail 14 with an associated feed bar 15 having a screw thread 16 (see FIGS. 2 and 3). The feed bar 15 is rotatably mounted in bearings 17a,17b at opposite ends of the rail 14 and a screw thread 16 of the feed bar 15 is uncovered in the region between the bearings 17a,17b. The feed bar 15 is rotated by means of an electric motor 18, so that fish hooks 19, which are suspended on the feeding arrangement 11 via the hook portion 19a (see FIGS. 2 and 3), are automatically pushed forwards in a row from left to right of FIG. 1, along the screw thread 16 of the feed bar 15 and along bearing 17b flush with that at the right end of the feeding arrangement 11 of FIG. 1.

At the right hand end of the feeding arrangement 11 (see FIGS. 2–5) the rail 14, that is to say that portion of the latter which forms the bearing 17b, is terminated endwise close to the hook-catching arrangement 12, which extends vertically across the rail 14, so that the fish hooks 19 are fed continuously to a support abutment against the hook-catching arrangement 12.

The hook-catching arrangement 12 comprises a carrier plate 20. On the one, rear side of the carrier plate 20 a cylinder 21 is carried having a reciprocating piston rod arrangement 22,23,24. On the other, front side of the carrier plate 20, the piston rod arrangement 22–24 carries a slide 25 having a slide member 26 projecting laterally outwards therefrom. The slide member 26 is adapted to be moved vertically upwards and downwards in a path close to the end face of the bearing 17b at the illustrated right end of the rail 14.

The slide member 26 is shown in its upper position, i.e. in is hook catching position in FIGS. 2 and 4, while being shown in its lower position, i.e. in its delivery position in FIGS. 3 and 5. The slide member 26 is provided at its lower end with a cavity 27 having a depth corresponding to the thickness of the hook portion 19a on a fish hook 19. The cavity 27 has a horizontally extending upper bounding face 27a and a vertically extending rear bounding face 27b plus a lower bounding face 27c extending obliquely outwards and downwards. In the upper position of the slide member 26a port opening 27d to the cavity 27 faces towards the right end of the rail 14 flush with an adjacent nook portion 19a of the fish hook 19, which is arranged on the right end of the rail 14. When the slide member 26 assumes the upper hook catching position, a fish hook 19' is automatically pressed by the feeding arrangement 11 into the cavity 27 of the slide member 26, as is illustrated in FIG. 4.

More specifically the cavity 27 is designed so that there is only space for a single fish hook 19' at a time in the cavity and so that the fish hook is held stable in place in the cavity during movement of the slide member past the rail 14, but moreover so that the fish hook falls out of the cavity immediately after the slide member has passed the rail 14.

Immediately after the slide member 26 is pushed downwardly from the illustrated upper hook catching position (FIGS. 2 and 4), a front side 26a of the slide member 26 will bar the succeeding fish hook 19" in the subsequent row of fish hooks, as is illustrated in FIGS. 3 and 5.

In FIG. 3 the slide member 26 is shown in its lower hook delivery position, in which the cavity 27 is uncovered for discharging the fish hook 19' into the subsequent chute 13. The discharging occurs due to the fish hook 19' sliding out of engagement with the cavity 27 of the slide member 26 along the obliquely extending guide surface 27c and landing in the obliquely extending chute 13 just below the slide member 26.

Thereafter, the slide member 26 is led back from the lower delivery position to the upper catch position. A succeeding fish hook 19" is received automatically in the cavity 27 of the slide member 26 in order in a following cycle to discharge the fish hook 19" into the chute 13 in a corresponding manner as explained for the fish hook 19'.

As is evident from FIGS. 1–3 each of the fish hooks 19 is arranged in a hanging condition with its fish hook shaft 19b supported on one and the same (rear) side of the rail 14. Over the major portion of the area of the rail 14 the fish hook 19b hangs rather steeply downwards. At the right end according to FIGS. 1–3, the rail 14 is provided with a guide edge 28 extending obliquely upwards, which permits automatic readjustment of the shaft portion 19b of the fish hooks 19 from a relatively steep to a more obliquely outswung path. This involves the fish hooks 19, even when they find themselves on the rail 14, being swung into place over a guide surface 29 (see FIG. 1) which is located continuously of the subsequent chute 13. Immediately the fish hook 19' slides off from the slide member 26 it is landed in place in a V-shaped groove in the guide surface 29 on order thereafter to slide further into an equivalent V-shaped groove in the intake to the chute 13, with the shaft portion 19b supported along the bottom of the chute 13 and with the hook portion 19a resting against the one, left side (see FIG. 7) of the V-shaped groove in the chute 13.

As is evident from FIG. 1 the chute 13 is divided into four sections 30–33 which are normally mutually partitioned off by means of three flaps 34–36, which are controlled by their respective compressed air cylinders 37,38,39.

A first section 30 is bounded below by a first flap 34, which secures the fish hook 19 in place in an accurately intended position longitudinally on the chute 13 for inspection with quality sorting. In the first section 30, the fish hook 19 is inspected as shown in FIG. 6 via for example four sensors 41,42,43,44, which sense their respective portion of the fish hook 19, that is to say a first 41 and a second 42 sensor, which sense the hook portion 19a of the fish hook 19 and a third 43 and a fourth 44 sensor which sense the shaft portion 19b of the fish hook 19. If the fish hook 19 at the inspection undertaken shows itself to be defective, the fish hook is immediately removed from the section 30. In the illustrated embodiment, there is shown in FIG. 7 a nozzle-farming bore 45, which discharges into the bottom of the chute 13. By means of compressed air, which is blown through the bore 45, the defective hook is blown sideways towards the left out of the chute 13.

On the other hand, adequate fish hooks pass further in the chute 13, one by one at a time, from the section 30 via the sections 31,32 and 33 one after the other and are fed from the section 33 directly to the intake 13a to a conventional baiting machine in a position adapted for this purpose in readiness for baiting.

The section 30 forms a transition between the guide surface 29 and the chute 13 and is provided with a curved guide surface portion for turning hook portion 19a of the fish hook 19 from an obliquely positioned to a vertically positioned support position, immediately the fish hook is transferred from the section 30 to the section 31.

A second section 31 and a third section 32 which are bounded between their respective pairs of flaps 34,35 and 35,36 form buffers for sorted, accepted fish hooks, so that the baiting machine has available the whole time a supply of made ready, quality sorted fish hooks, whereby the baiting machine can operate at an optimal baiting speed, even on incorporating the quality control of the fish hooks just in front of the intake to the baiting machine.

I claim:

1. An apparatus for conveying fish hooks comprising:
    a rail for the reception of fish hooks in a hanging condition thereon;
    a feeding arrangement for conveying fish hooks on said rail in series toward one end of said rail;
    a chute at said end of said rail for delivering fish hooks from said rail to a baiting machine; and
    a hook handling arrangement for sequentially moving the hooks on said end of said rail to said chute, said hook-handling arrangement including a slide member transverse to said rail and movable between a hook catching position and a hook delivery position, said slide member having a cavity facing said rail for receiving a portion of a hook therein with said slide member in said hook catching position.

2. An apparatus as set forth in claim 1 wherein said slide member has a downwardly extending guide surface defining said cavity for slidably discharging a hook from said cavity into said chute with said slide member in said hook delivery position.

3. An apparatus as set forth in claim 1 wherein said cavity is of a depth equal to a thickness of a received hook.

4. An apparatus as set forth in claim 1 wherein said rail has a vertical side surface for sliding of a shaft portion of a received fishing hook thereon and an obliquely extending guide edge at said one end of said rail for sliding of a shaft portion of a received hook thereon to allow movement of the shaft portion of a hook from a vertical plane into a plane angularly disposed relative to said vertical plane.

5. An apparatus as set forth in claim 1 wherein said chute has a first section for receiving and inspecting each received fish hook and at least a second section extending from said first section to deliver each received hook to a baiting machine.

6. An apparatus as set forth in claim 5 which further comprises at least one sensor in said first section for sensing a physical characteristic of a hook in said first section and means for ejecting a hook from said first section in response to a signal from said sensor.

7. An apparatus as set forth in claim 6 wherein said chute has a curved guide surface between said sections for tuning a hook portion of a received hook from an oblique position to a vertical position.

\* \* \* \* \*

UNITED STATES PATENT AND TRADEMARK OFFICE
CERTIFICATE OF CORRECTION

PATENT NO. : 5,862,620
DATED : January 26,1999
INVENTOR(S) : Kolbjorn Bjorshol

It is certified that error appears in the above-identified patent and that said Letters Patent is hereby corrected as shown below:

Column 1, line 41, change "nook" to -hook-

Column 3, line 33, change "nook" to -hook-

Column 4, line 11, change "on" to -in-

Line 34, change "farming" to -forming-

Signed and Sealed this

Twenty-fifth Day of May, 1999

Attest:

Q. TODD DICKINSON

*Attesting Officer*      *Acting Commissioner of Patents and Trademarks*